Feb. 18, 1941.  L. M. MONROE  2,232,621
FLY HOLDER
Filed Sept. 8, 1939
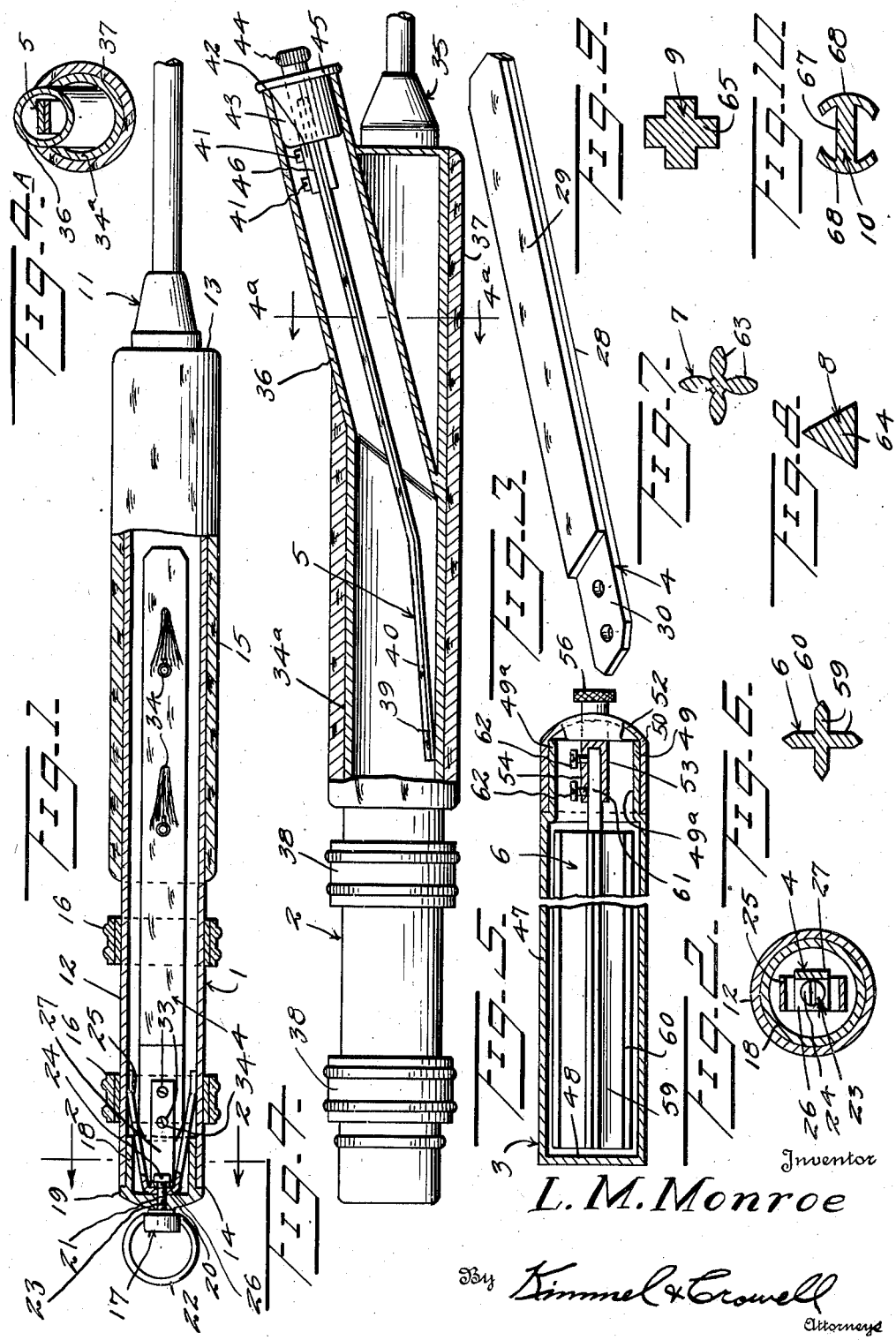
Inventor
L. M. Monroe
By Kimmel & Crowell
Attorneys

Patented Feb. 18, 1941

2,232,621

UNITED STATES PATENT OFFICE 2,232,621

FLY HOLDER

Lloyd Merle Monroe, Pontiac, Mich.

Application September 8, 1939, Serial No. 293,944

10 Claims. (Cl. 43—23)

This invention relates to a holder-structure for artificial flies and fish hooks.

It is well known that many fishermen employ artificial flies for fishing, but have no handy or suitable means in which the flies and hooks may be stored when not in use, and it is the aim of this invention to provide, in a manner as hereinafter set forth, a convenient holder-structure whereby this difficulty may be eliminated.

The invention further aims to provide, in a manner hereinafter set forth, a holder-structure including a holding element to which the flies or fish hooks may be fastened by their barbs when not in use, a protecting housing or cylinder for removably receiving said element with the flies or hooks attached thereto, and the housing or cylinder formed by the handle of a fishing rod or independent of the rod.

The invention further aims to provide, in a manner as hereinafter set forth, the holding element aforesaid being so constructed to facilitate its insertion and removability to and from the housing or casing when desired.

The invention further aims to provide, in a manner as hereinafter set forth, a holder-structure with means for releasably retaining the holding element in the housing or casing to prevent it from being accidentally dislodged from the latter, especially when such element is arranged in the fishing rod handle during fishing.

The invention further resides in the provision of a holding element of a form to be hereinafter set forth to which flies or fish hooks may be removably fastened by their barbs and encased within a fishing rod handle or cylinder when not in actual use, yet the said element is so constructed as to facilitate its withdrawal from, as well as to insure its return to an out-of-the-way position when not in actual use.

The invention further aims to provide, in a manner as hereinafter set forth, a holder-structure for the purpose referred to which is simple in its construction, strong, durable, compact, thoroughly efficient for the purpose intended thereby, readily assembled and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein is shown embodiments of the invention, but it is to be understood that changes, variations and modifications may be resorted to which fall within the scope of the invention as claimed.

In the drawing:

Figure 1 is a fragmentary view in longitudinal section of a holder structure, in accordance with this invention with a part thereof provided by the handle of a fishing rod, Figure 2 is a section on line 2—2, Figure 1, Figure 3 is a perspective view of the fly and hook holding element of the structure, Figure 4 is a view similar to Figure 1 of a modified form, Figure 4A is a section on line 4A—4A, Figure 4, Figure 5 is a longitudinal sectional view of still another modified form of the holder structure, Figure 6 is a cross sectional view of the form of holding element employed in the structure shown by Figure 5, and Figures 7, 8, 9 and 10 are cross sectional views of modified forms of holding elements.

The drawing illustrates three holder structures, one generally indicated at 1, another at 2 and the other at 3. Each holder-structure will have as a part thereof a holding element to which the barbs of the flies and the hooks are detachably connected. Several different forms of holding elements are illustrated and indicated generally at 4, 5, 6, 7, 8, 9 and 10. The holder-structure 1 may have as a part thereof any one of the holding elements other than element 5, and it is shown as provided with element 4. The holder-structure 2 may have as a part thereof any one of the holding elements and it is shown provided with element 5. The holder-structure 3 may have as a part thereof any one of the holding elements other than the element 5.

Each holder-structure includes a housing, casing or cylinder and the latter of the holder-structure 1 or 2 is provided by the handle of a fishing rod. The housing, casing or cylinder of the holder-structure 3 is independent of the fishing rod.

Referring to Figures 1, 2 and 3, a fishing rod is indicated generally at 11 and it is formed with a hollow handle 12 closed at its forward end 13 and open at its rear end 14. The handle 12 forms the housing, casing or cylinder of the holder-structure 1, and has encompassing its forward portion a hand grip 15. The handle 12, rearwardly of grip 15, is provided with a pair of spaced parallel clamps 16 for holding a reel, not shown, in place upon the rod 11.

The rear open end 14 of the handle 12 is closed by a cap member 17 including an annular body part 18 for extending into and engaging with the rear terminal portion of the inner face of the handle. The rear end of body part 18 is formed at its outer face with a peripheral annular flange 19 which abuts the rear end edge of handle 12 when cap member 17 is mounted in position to close handle end 14. The outer end of body part 18 merges into a tapered head 20, which is also integral with the flange 19. The head 20 is formed axially with a threaded socket 21 opening at the inner face thereof. The head 20 is also provided with a pivoted grip in the form of a ring 22. Engaging in the socket 21 is a screw 23 having its head 24 spaced inwardly from the inner face of cap head 20. Mounted on the shank of screw 23 and bearing against the inner face of head 20 is a resilient inwardly directed V-shaped latching member 25 for engaging the inner face of handle 12 for latching the cap member 17 to the handle. Mounted on the shank of screw 23 between the bight of the member 25 and the head 24 of screw 23 is the apertured flange 26 of an inwardly directed apertured coupling member 27 for the holding element 4, which is removably housed in the handle 12. The head 24 of the screw 23 acts to maintain the bight of member 25 and the flange 26 of member 27 in abutting relation. The screw 23 secures the members 25 and 27 to the cap member 17.

The holding element 4 is of conventional form and is shown by way of example as straight and consists of a stiffener section 28 and a penetrable section 29 secured to one side face of and of less length than the said section 28. Preferably sections 28 and 29 will be formed respectively of Celluloid and cork, but it is to be understood that they may be formed of any other suitable material. The rear end of section 29 is arranged forwardly of the rear end of section 28. The rear terminal portion 30 of section 28 is provided with a pair of spaced aligned openings 31, which register with the openings 32 formed in the coupling member 27. Extending through the said registering openings are screws 33 for connecting element 4 to member 27 whereby when cap member 17 is removed from the handle 12, element 4 will be carried therewith. The sections 28, 29 are flat and substantially of rectangular form. The flies or hooks are adapted to have their barbs detachably connected to the section 29 of element 4, and with reference to Figure 1 a pair of flies 34 are shown attached to the section 29 of element 4. The inner dimensions of the handle 12 relative to the element 4 are such as to provide sufficient clearance for the element 4 with the flies or hooks therein, when such element is arranged in the handle, as well as to permit element 4 when carrying flies or hooks to be conveniently inserted in the handle.

The holder-structure 2 (Figure 4) includes as a part thereof the hollow handle 34ª of a fishing rod 35. The handle 34ª is formed with a tubular branch 36, which is disposed at an upward inclination from rear to front and extends beyond the forward end of handle 34ª. The latter coacts with the branch 36 to form an angle-shaped housing, casing or cylinder for the holding element 5. The branch 36 at its lower end merges into the body of the handle 34ª between the transverse median of the latter and its forward end. The branch 36 extends through the top of handle 34ª, as well as through the top of a hand grip 37, which encompasses the forward portion of the handle 34ª. The rear end of the latter is closed. The handle 34ª rearwardly of the hand grip is provided with spaced clamps 38 for securing thereto a reel, not shown.

The holder element 5 is of conventional form and, by way of example of angle-shaped contour and formed of a stiffener section 39 and a penetrable section 40. The upper or forward end portion of element 5 is secured by binding screws 41 to a coupling member 42, which is arranged within and extended rearwardly from a stopper 43 for the upper end of the branch 36. The stopper 43 preferably will consist of cork and carries, at its outer end, a cap piece 44 provided with a finger grip or knob 45 to facilitate the removal and insertion of the stopper 43 relative to the open upper end of the branch 36. The holder-structure 2 is of a form whereby the holder element 5 may be stored at a point where it may be removed from and inserted into the handle 34ª at the forward end of the latter. The stopper 43, coupling member 42, cap piece 44 and grip 45 are so arranged to constitute a single unit. The coupling member 42 is formed with a bifurcation 46 into which the upper end of holder element 5 is arranged. The screws 41 aforesaid are arranged below the inner end of stopper 43. The latter frictionally engages with the inner face of branch 36 to prevent the accidental removal thereof when the rod 35 is used. The holder element 5 will be of the same cross sectional contour as the holder element 3.

The holder-structure 3 includes a housing, casing or cylinder 47, which is independent of a fish rod. The housing 47 is closed at one end, as at 48, and open at its other end, as at 49. The housing 47 has a reduced end terminal portion 49ª. A removable closure or cap 50 is employed for the end 49 of the housing 47. The cap 50 includes an annular body part 51, which encompasses the reduced portion 49ª of the housing. The body part 51 and housing 47 are detachably secured together by any suitable means, which may be, by way of example, a bayonet slot connection. The body part 51 merges at its outer end in a head 52 of arcuate form in diametrical section. The inner face of head 52, axially thereof has formed integral therewith an inwardly directed coupling member 53 provided with a furcation 54. A knob or finger grip 55 is provided on the cap 50. Arranged within the housing 47 is the holding element 6, which includes a body part 58 of a contour, in cross section similar to a Greek cross having its arms 59 pointed, as at 60. The element 6 also includes a flat stem 61 projecting from the outer end of body part 58 into the furcation 54 of the coupling member 53. The stem 61 is secured to the member 52 by the binding screws 62 extending into said member and bearing against the stem 61. The holding element 6 is revoluble relative to housing 47.

The holding element 7 is substantially of the same cross sectional contour as element 6 with this exception that the arms 63 of element 7 are of substantially ovoidal contour in cross section. The element 8 has its body 64 of triangular contour in cross section. The element 9 is substantially of the same cross sectional contour as element 6, with this exception that the arms 65 of element 9 are wider than the arms of element 6 and couped at their outer ends, as at 66. The element 10 comprises a flat rectangular body part 67 having its side edges integral with the inner faces of a pair of upstanding oppositely disposed strips 68 of arcuate contour in cross section. The body part 67 is disposed centrally with respect to the inner faces of the strips 68.

The coupling members may also be termed clamps for clamping the holding elements to the caps or closure for the open ends of the housings, casings or cylinders.

It is to be understood that the holder elements are revoluble in the housings, casings or cylinders, and that the term cylinder applies to a housing or casing.

I claim:

1. A fly holder structure of the character set forth, a cap, a clamp that revolves within the cap, a fly holding element, the clamp being fastened to the said element allowing the latter to be revolved within a cylinder or rod handle.

2. In a fly holder-structure, a cylinder open at one end, an elongated fly holding element removably arranged within said cylinder, a closure cap for said end removably mounted relatively to said cylinder and rotatable relative to the latter, and a coupling member bodily revoluble with the cap and secured to said element to provide for the latter bodily revolving with said cap.

3. In combination, the handle portion of a fishing rod providing a cylinder open at one end, an elongated fly holding element removably mounted in said cylinder lengthwise thereof, a removable closure for said end of the cylinder, a coupling member bodily carried with and having a portion extending inwardly from said closure into said cylinder, and means for securing the said portion of said member to an end terminal part of said element.

4. In combination, a handle portion of a fishing rod providing a cylinder open at one end, an elongated fly holding element removably mounted in said cylinder lengthwise thereof, a removable closure for said end of the cylinder, a coupling member bodily carried with and having a portion extending inwardly from said closure into said cylinder, and means for securing the said portion of said member to an end terminal part of said element, the inner dimensions of said cylinder with respect to said element when the latter is holding flies providing a clearance between the inner face of the cylinder and flies whereby the said element may be expeditiously withdrawn from and inserted into the cylinder respectively on the removing and securing the cap to and from said cylinder.

5. In a fly holder structure, a cylinder open at one end, an elongated fly holding element removably arranged in said housing, a removable cap for closing said end, a resilient latching member engaging the inner face of the cylinder inwardly of said open end for latching the cap to the cylinder, a coupling member secured to one end of said element for connecting them together, and means disposed axially of said cap and common to said members for fixedly securing them to said cap.

6. A fly holder structure comprising in combination, a hollow handle of a fishing rod providing a cylinder open at one end, an elongated fly holding element removably arranged within and disposed lengthwise of said cylinder, a removable closure cap for said end provided with a coupling member extended into said cylinder, and means for securing said coupling member to an end terminal of said element whereby said cap, member and element are bodily shifted together on the shifting of the cap from and towards said end.

7. A fly holder structure comprising in combination, a hollow handle of a fishing rod providing a cylinder open at one end, an elongated fly holding element removably arranged within and disposed lengthwise of said cylinder, a removable closure cap for said end provided with a coupling member extended into said cylinder, and means for securing said coupling member to an end terminal of said element whereby said cap, member and element are bodily shifted together on the shifting of the cap from and towards said end, said opening end of the cylinder being at the rear end of the latter.

8. A fly holder structure comprising in combination, a hollow handle of a fishing rod providing a cylinder open at one end, an elongated fly holding element removably arranged within and disposed lengthwise of said cylinder, a removable closure cap for said end provided with a coupling member extended into said cylinder, and means for securing said coupling member to an end terminal of said element whereby said cap, member and element are bodily shifted toegther on the shifting of the cap from and towards said end, said open end of the cylinder being at the forward end of the latter.

9. In combination, a fishing rod having a hollow handle open at its rear end, a fly holding element removably mounted in said handle lengthwise thereof, a removable cap detachably connected to said handle for closing said end, said cap capable of being revolved relative to said handle, a coupling member secured at its outer end to said cap axially of the latter, said member extending forwardly from said cap into said handle, and means for fixedly securing the forward end of said member to the rear end of said holding element for connecting said cap, member and element together to provide for them bodily revolving in unison.

10. In a fly holder structure, an elongated member for retaining the barbs of artificial flies and for removably positioning in the handle of a fishing rod, said member having attachments for retaining it to the usual type of fishing rod cap, said attachments comprising a clamp arranged in the cap and secured to said member, a screw fastening extended into the cap and connected at its inner end to said clamp, a spring arranged in the cap and engageable with the rod for removably securing the cap to the rod handle to make said member readily accessible, said spring being connected to the inner end of said screw fastening, and a ring exteriorly of the cap and connected to said screw fastening.

LLOYD M. MONROE.